5 Sheets—Sheet 1.

J. B. HADAWAY.

STITCH SEPARATING AND INDENTING MACHINE.

No. 11,587. Reissued Feb. 2, 1897.

WITNESSES

A. E. Lane

A. G. Gifford.

INVENTOR

John B. Hadaway.

By his attorneys

Phillips & Anderson.

J. B. HADAWAY.

STITCH SEPARATING AND INDENTING MACHINE.

No. 11,587. Reissued Feb. 2, 1897.

WITNESSES
A. C. Lane
A. G. Clifford.

INVENTOR
John B. Hadaway.
By his attorneys
Phillips & Anderson.

J. B. HADAWAY.

STITCH SEPARATING AND INDENTING MACHINE.

No. 11,587. Reissued Feb. 2, 1897.

WITNESSES

A. E. Kline

D. G. Clifford

INVENTOR

John B. Hadaway,

By his attorneys

Phillips & Hudson

J. B. HADAWAY.
STITCH SEPARATING AND INDENTING MACHINE.
No. 11,587. Reissued Feb. 2, 1897.
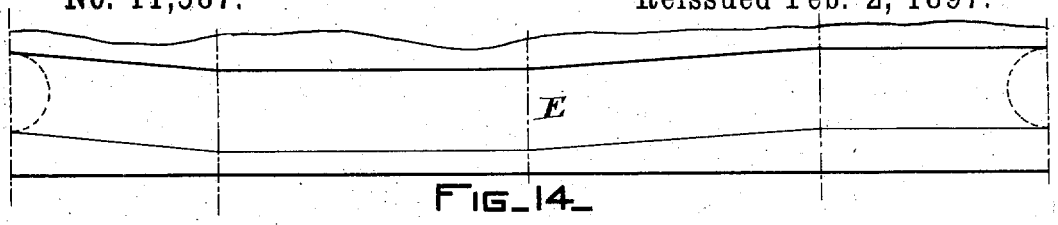
FIG_14_
FIG_12_
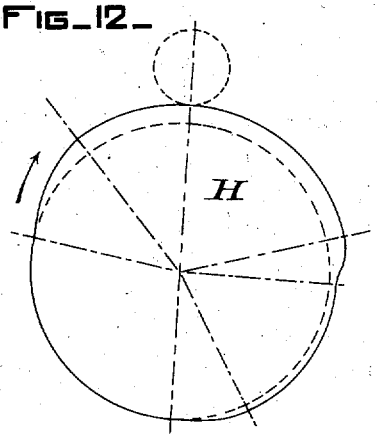
FIG_13_
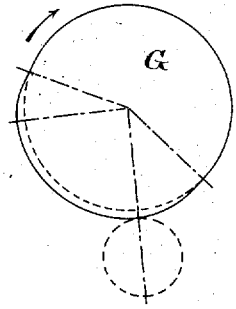
FIG_11_
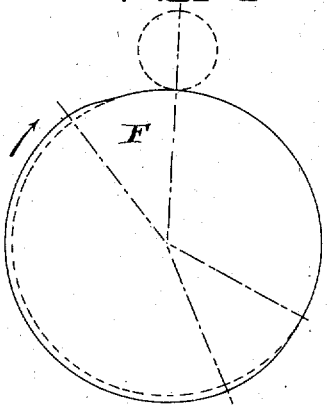
FIG_6_
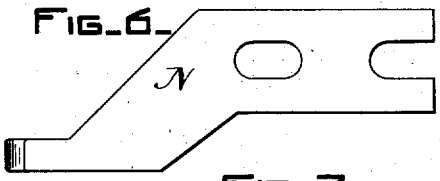
FIG_7_
FIG_16_
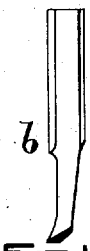
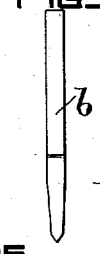
FIG_15_
FIG_9_
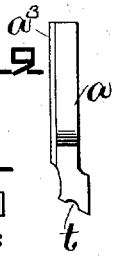
FIG_10_
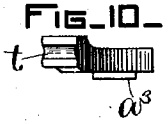
FIG_8_
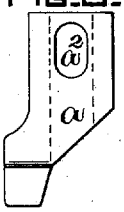
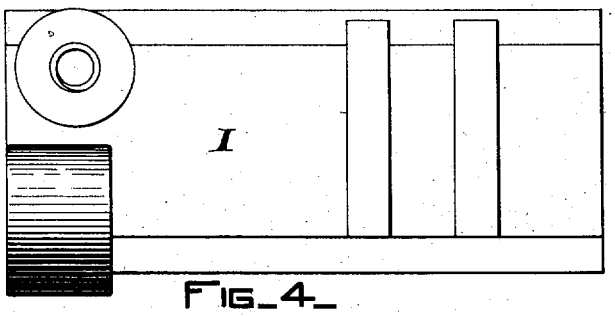
FIG_4_
FIG_5_
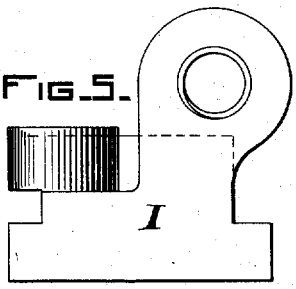
WITNESSES
A. W. Crane
A. G. Clifford.
INVENTOR
John B. Hadaway.
By his attorneys
Phillips & Hudson 5 Sheets—Sheet 5.

J. B. HADAWAY.

STITCH SEPARATING AND INDENTING MACHINE.

No. 11,587. Reissued Feb. 2, 1897.

WITNESSES

A. C. Crane

A. G. Clifford

INVENTOR

John B. Hadaway,

By his attorneys

Phillips & Anderson.

UNITED STATES PATENT OFFICE.

JOHN B. HADAWAY, OF BROCKTON, MASSACHUSETTS.

STITCH-SEPARATING AND INDENTING MACHINE.

SPECIFICATION forming part of Reissued Letters Patent No. 11,587, dated February 2, 1897.

Original No. 549,291, dated November 5, 1895. Application for reissue filed August 18, 1896. Serial No. 603,160.

*To all whom it may concern:*

Be it known that I, JOHN B. HADAWAY, of Brockton, in the county of Plymouth and State of Massachusetts, have invented certain new and useful Improvements in Stitch-Separating and Indenting Machines, of which the following, taken in connection with the accompanying drawings, is a specification.

My invention relates to stitch-separating and indenting machines; and it consists in certain novel features of construction, arrangement, and combination of parts which will be readily understood by reference to the description of the accompanying drawings and to the claims hereto appended, and in which my invention is clearly pointed out.

Figure 1:
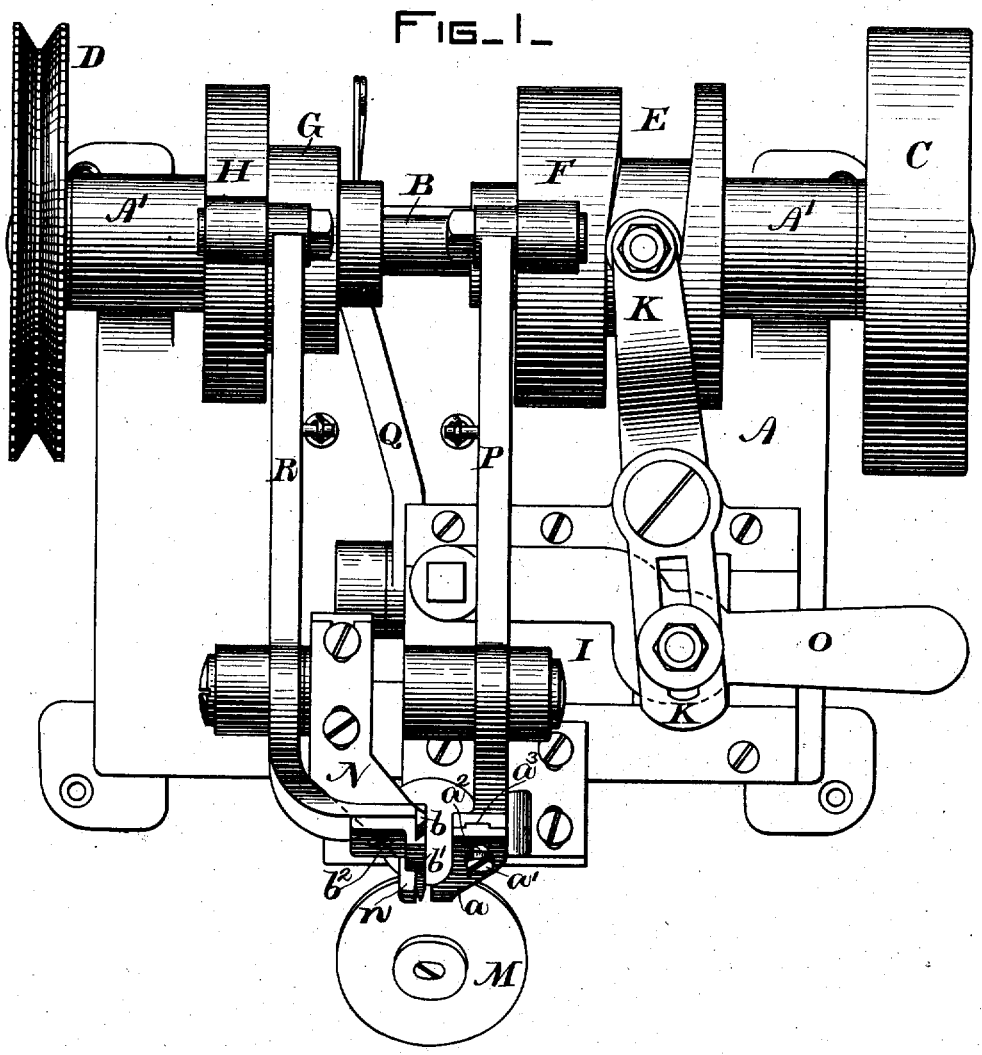
Figure 17:
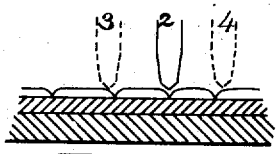
Figure 2:
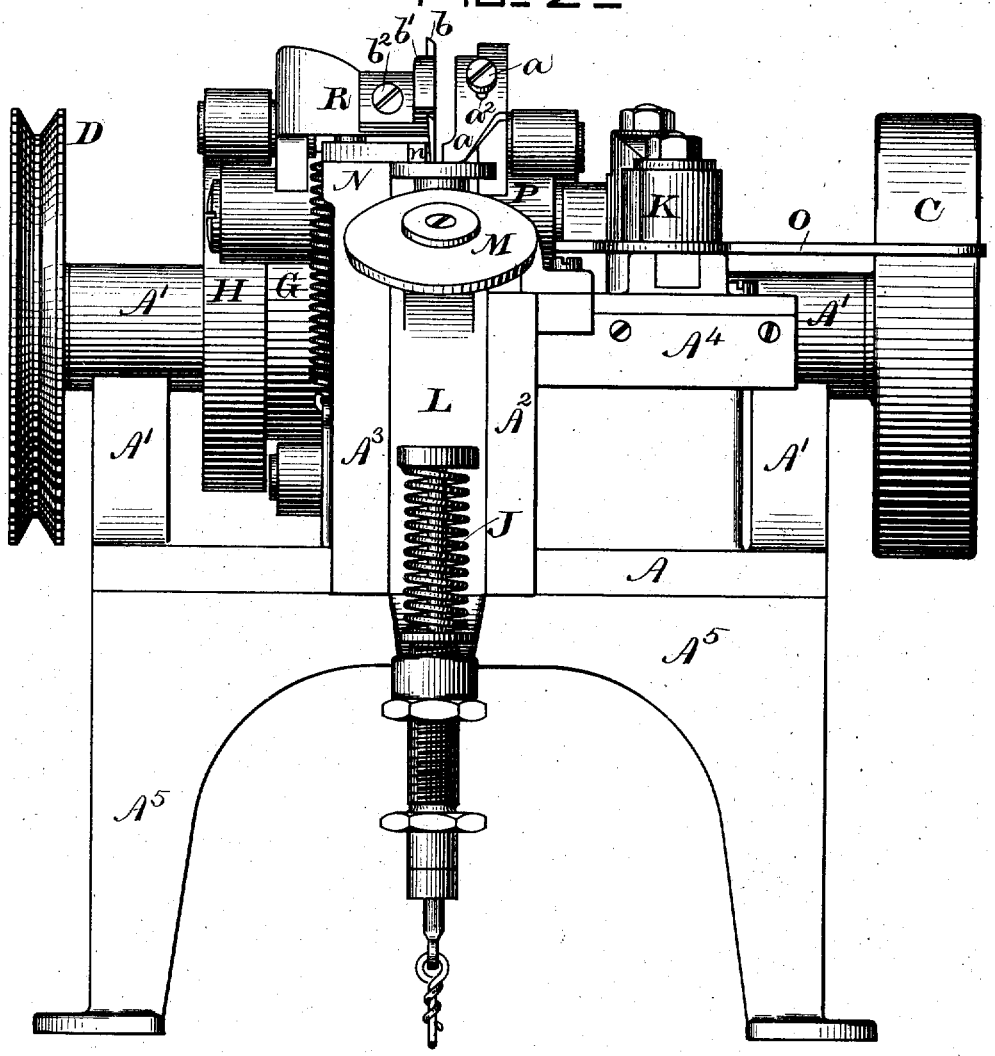
Figure 3:
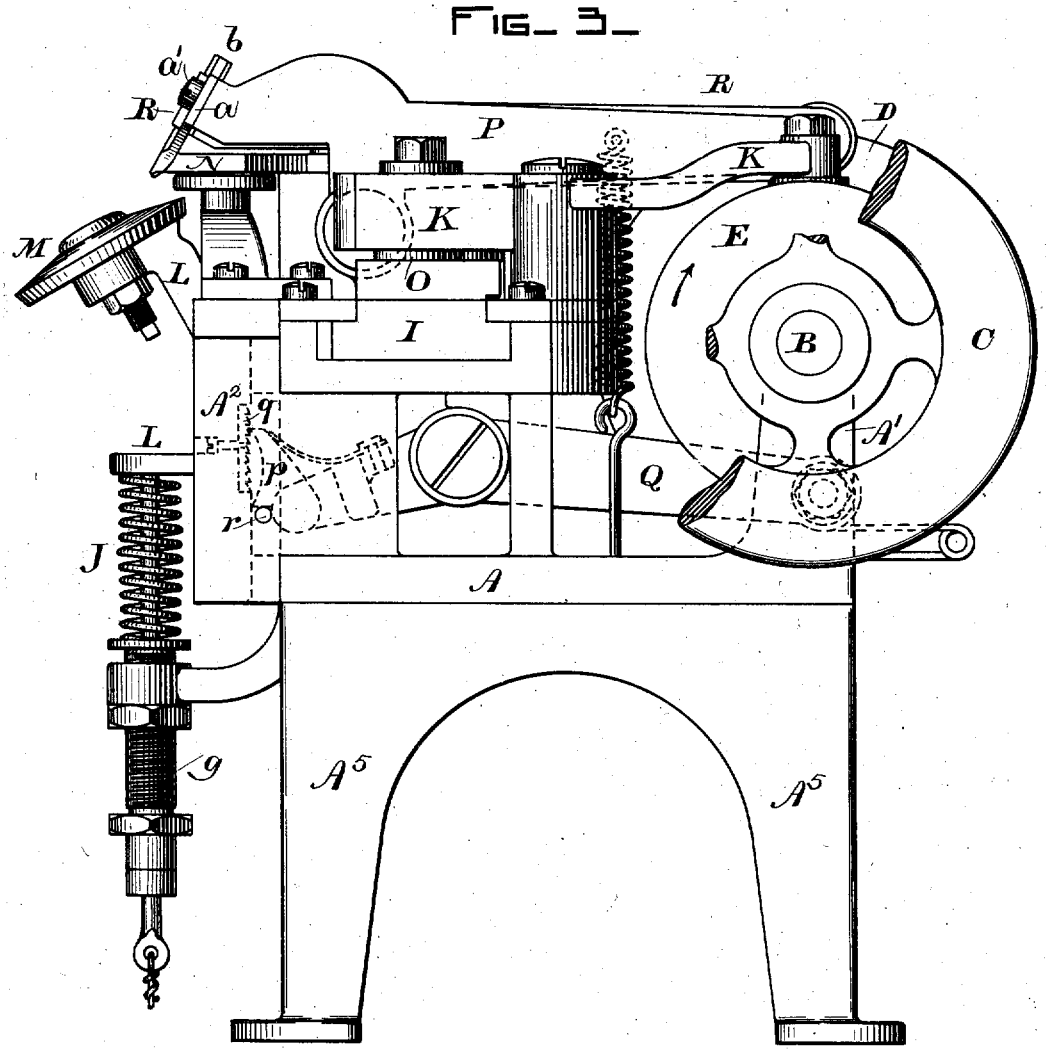
Figure 18:
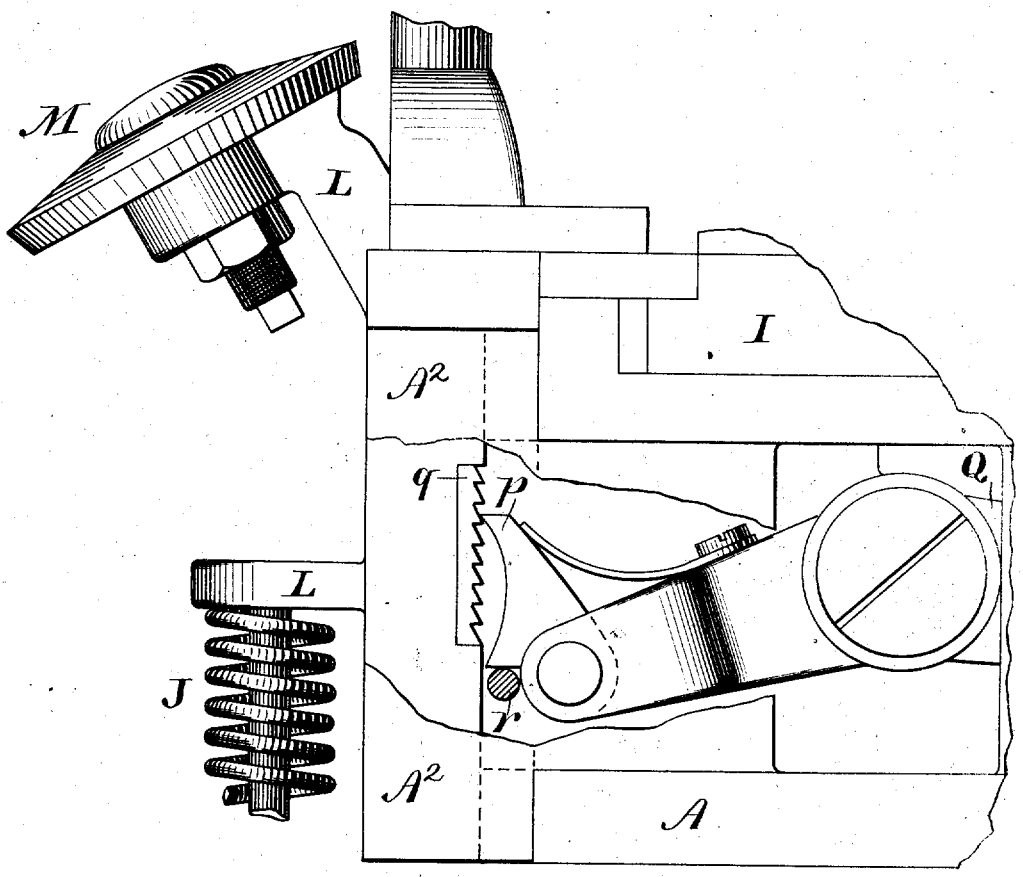

Figure 1 of the drawings is a plan of a machine illustrating my invention. Fig. 2 is a front elevation of the same. Fig. 3 is a side elevation of the same. Figs. 4 and 5 are respectively a plan and an end elevation of the feed-slide. Figs. 6 and 7 are respectively a plan and an edge view of the upper work-support. Figs. 8, 9, and 10 are respectively a front elevation, a side elevation, and an inverted plan of the presser-foot. Fig. 11 is an elevation of the presser-foot-operating cam, looking toward the left of Fig. 1. Fig. 12 is an elevation of the cam for operating the separating and indenting tool. Fig. 13 is an elevation of the locking-cam. Fig. 14 is a development of the path of the feed-cam upon a flat plane. Figs. 15 and 16 are respectively a side elevation and an edge view of the separating-tool. Fig. 17 is a diagram illustrating how the secondary feed is obtained to separate stitches of varying lengths, and Fig. 18 is a side elevation of the pawl and ratchet.

The object of my present invention is the production of a machine that is simple in construction, effective in operation, and by the use of which the stitches may be accurately separated and the welts indented in work containing stitches of uniform or slightly-varying lengths. To this end the feeding and separating mechanisms are positive in their working movements and operate, in conjunction with a yielding work-support, a fixed upper work support or stop to limit the upward movement of the work.

The principal features of novelty in my present invention as compared with the inventions described in the Letters Patent Nos. 521,978, 536,338, 537,823, and 543,012, granted to me June 26, 1894, March 26, 1895, April 23, 1895, and July 23, 1895, respectively, and in the applications filed by me June 1 and 28, 1895, respectively, and serially numbered, respectively, 551,342 and 554,372, are, first, the employment of a presser-foot acting in conjunction with a lower yielding work-support to feed the work a definite and predetermined distance corresponding to the standard or average length of stitch for the sample of work in hand, and in conjunction with a fixed finger to form an upper work-support or a stop to limit the upward movement of the work, and, second, a two-throw positive downward movement of the separating and indenting tool with a standstill or rest between them, in conjunction with cams for operating the presser-foot, the locking mechanism, and the separating and indenting tool so constructed and timed relative to each other that the under surface of the presser-foot when in its normal position shall be on a level with the under surface of the fixed stop-finger, shall be depressed below said normal position while feeding the work and until the separating and indenting tool has been moved the first step in its downward movement and be raised to its normal position between the two downward movements of said separating and indenting tool, and that the locking-pawl shall be thrown into contact with the ratchet-locking plate before the last downward movement of the separating and indenting tool in such a manner as to permit the last downward movement of said tool to depress said work-support sufficiently to relieve the work from contact with the fixed stop-finger and then prevent further downward movement, while said tool completes the indenting of the welt and by the action of its inclined side upon the shoulder of a stitch moves the work upon the work-support to the right or left, according as the stitch is longer or shorter than the standard or average stitch.

In the drawings, A represents the bed of the machine-head, provided with the bearings A′ A′, the upwardly-projecting blocks $A^2$ and $A^3$, and supported upon the legs $A^5$; B, the cam-shaft; C, the hand-wheel; D, the driving-pulley; E, the feed-cam; F, the presser-foot-operating cam; G, the locking-cam. H is the separator-cam, I is the feed-slide, and K is the cam-lever for operating said slide, all constructed and arranged substantially as in another application of mine filed June 1, 1895, Serial No. 551,342, except that the cams have their throws constructed and arranged relative to each other, so as to cause the several movements of the working parts of the machine to be timed to produce the results hereinafter described.

L is the vertically-movable slide, and M is the lower and yielding work-support, mounted thereon and pressed upward by the spring J and adjustable by the threaded sleeve *g*, substantially as in the Letters Patent No. 543,012, granted to me July 23, 1895.

O is a hand-lever for adjusting the pin connecting the feed-slide with its operating-lever, constructed and operating substantially as in my before-cited application.

P is the presser-foot lever, Q the locking-lever, and R is the separator-lever, all arranged substantially as in said prior application and operated, respectively, by the cams F, G, and H. The front end of the lever P has firmly secured thereto the presser-foot *a*, but so as to be adjustable vertically thereon by the screw $a'$ passing through the slot $a^2$ and screwing into the lever P, said lever having a vertical groove formed in its front end to receive the rib $a^3$ on the rear of said presser-foot to prevent said foot from being moved about the clamping-screw $a'$, all as shown in Fig. 1.

The front end of the lever R has rigidly secured thereto by the plate $b'$ and the clamping-screw $b^2$ the separating and indenting tool *b*, the lower end of which is made wedge-shaped with its point slightly rounded, as shown in Fig. 16.

The pawl *p*, pivoted to the front end of the lever Q, and the pin *r*, set in the block $A^2$, are so arranged relatively to each other that when said pawl is thrown into contact with the ratchet-plate *q* and is raised to its highest position the upper end of said pawl will be slightly below the shoulder of the tooth of said ratchet next above the end of said pawl, so that the lower work-support M may be slightly depressed by the downward movement of the indenting-tool to relieve the upper surface of the work from contact with the stop-finger or upper work-support N.

The upper work-support N differs from that shown in my before-cited application and patent in that it has but a single narrow finger *n* to bear upon the work instead of two fingers with a slot between, as in said prior inventions, one of said fingers being cut away and the presser-foot substituted therefor.

The operation of my invention is as follows: The several parts of the machine being in the position shown in the drawings—viz., the presser-foot in its normal position, with its under surface in the same plane as the under surface of the stop-finger and coöperating therewith to form the upper work-support, the separating-tool in its lowermost position, a boot or shoe in position upon the lower work-support, with the upper surface of the welt bearing against the upper work-support, and the locking-pawl in contact with the ratchet-plate—if the shaft B be revolved in the direction indicated by the arrow on Fig. 3 the first forty degrees of movement of said shaft will unlock the lower work-support and depress the presser-foot to clamp the sole between it and the lower work-support, which is at the same time slightly depressed to relieve the work from contact with the finger N. The next forty degrees of the revolution raises the separator-tool, leaving the work free to be fed by a movement of the feed-slide I toward the left of Figs. 1 and 2, carrying with it the presser-foot and moving the lower work-support about its axis, which movement takes place during the next one hundred degrees, causing a movement of the work toward the left a distance equal to the length of a standard or average stitch, the pin connecting the feed-slide with its operating-lever having previously been adjusted to give to said slide a movement corresponding to the length of the average stitch of the sample of work in hand. The next twenty-five degrees of the revolution causes a descent of the separating-tool through about one-half of its downward movement, and if the stitch to be separated is of the standard length the point of the separating-tool will be directly above the space between the two stitches, as shown at 2 on Fig. 17; but if the stitch to be separated is longer or shorter than the standard stitch the beveled point of the separating-tool, when it is moved downward through the first half of its downward movement, will come in contact with the rounded or oval shoulder of a stitch at the left or right of the space into which it is to enter, according as the stitch is longer or shorter than the standard stitch, as shown at 3 and 4 on Fig. 17. The next forty degrees of the revolution raises the presser-foot to its normal position, releasing the grip upon the work if the stitch to be separated is longer or shorter than the standard, because of the contact of the stitch-shoulder with the separating-tool preventing the lower work-support being moved upward as fast as the presser-foot, thus leaving the work free to be moved either to the right or left by the action of the stitch-shoulder upon a beveled side of the point of the separating-tool as it is pressed upward by the tension of the spring J to bring the center of the space between the two stitches directly beneath the center of the separating-tool, as shown at 2 on Fig. 17. During the next twenty-five degrees of the revolution the locking-pawl is moved into contact with the ratchet-plate, with its upper end slightly below the shoulder of a ratchet-tooth of the locking-plate *q*, and the next fifteen degrees of the revolution completes the downward movement of the separating and indenting tool to complete the separating of the stitches and the indenting of the welt. The next seventy-five degrees of the revolution moves the presser-foot to the right a distance equal to the length of a standard stitch, thus completing a revolution of the cam-shaft, with all the parts of the machine in the positions they occupied at starting.

It will be observed that when the stitches are of standard or uniform lengths the feeding of the work is all effected by the horizontal movement of the presser-foot, but if the stitch is longer or shorter than the standard stitch a secondary feed of the work is effected by a moving contact of the rounded shoulder of a stitch with a beveled side of the point of the separating-tool, which may be caused by an upward movement of the lower work-support, a downward movement of the separating-tool, or a combination of both movements. It will also be observed that the feeding by the presser-foot is not accomplished by engagement with the shoulder of the stitch, but by frictional contact with surface of the welt upon either side of the line of stitching, the lower end of the presser-foot having formed therein a groove *t* to span the stitch and prevent pressure thereon.

What I claim as new, and desire to secure by Letters Patent of the United States, is—

1. In a stitch-separating and indenting machine the combination of a yielding lower work-support: a presser-foot provided with a groove in its working face to bridge the line of stitching: means for imparting a positive or unyielding movement to said presser-foot to clamp the work: and means for moving said presser-foot horizontally to feed the work uniform distances at regular intervals.

2. In a stitch-separating and indenting machine the combination of a yielding work-support: a positively-operated presser-foot coöperating with the yielding work-support to clamp and feed the work: a separating and indenting tool non-adjustable to varying lengths of stitches: means for imparting a positive or unyielding downward movement in two steps, to said separating-tool: and means for releasing the grip of the feeding mechanism between the two downward movements of the separating and indenting tool for the purpose specified.

3. In a stitch-separating and indenting machine the combination of a clamp or grip mechanism for feeding the work uniform distances at regular intervals: a separating and indenting tool non-adjustable to varying lengths of stitches: means for imparting a positive or unyielding downward movement, in two steps, to said tool to separate the stitches and indent the welt: means for releasing the grip of the feed mechanism between the two downward movements of said tool: and means for arresting the downward movement of the work and work-support before the indenting-tool has completed its downward movement.

4. In a stitch-separating and indenting machine the combination of a grip mechanism for feeding the work: a separating-tool: a yielding work-support: means for pressing said support upward: a fixed stop-finger to limit the upward movement of the work; means for imparting to said separator a positive or unyielding downward movement in two steps: means for releasing the grip of the feed mechanism: and means for arresting the downward movement of the work when released from contact with the stop-finger or upper work-support, all so constructed and arranged that a moving contact between the rounded shoulder of a stitch and an inclined side of the point of the separating-tool shall cause a secondary feeding of the work toward the left or right, according as the stitch to be separated is longer or shorter than the standard or average stitch.

5. In a stitch-separating and indenting machine the combination of a yielding lower work-support; an upper work-support comprising a fixed stop-finger and a movable bearing-surface: a separating and indenting tool having only upward and downward movements: means for imparting to said tool a positive or unyielding downward movement to separate the stitches and indent the welt: a presser-foot constructed and arranged to grip and feed the work: and mechanism for operating said presser-foot constructed and arranged to move it downward to clamp the work, then move it horizontally to feed the work uniform distances at regular intervals and then release the grip upon the work when the separating-tool has descended through about one-half its downward stroke, to leave the work free to automatically adjust itself to bring the space between two stitches directly beneath the point of the separating-tool.

6. In a stitch-separating and indenting machine the combination of a yielding lower work-support: a fixed stop-finger: a positively-operated presser-foot arranged with its under surface normally on a level with the under surface of said stop-finger and coöperating therewith to serve as an upper work-support: means for imparting to said presser-foot a positive or unyielding downward movement to clamp the work: means for moving said presser-foot horizontally to feed the work a uniform distance corresponding to the length of the standard or average stitch: means for arresting the downward movement of the work-support when the work is released from contact with the fixed stop-finger: a separating and indenting tool: and means for imparting to said tool a positive or unyielding downward movement to separate the stitches and indent the welt.

7. In a stitch-separating and indenting machine, the combination of a yielding lower work-support: a presser-foot constructed and arranged to bear upon the welt to grip the work between it and the work-support, without bearing upon the stitches: means for imparting a positive or unyielding downward movement to said presser-foot to clamp the work: and means for moving said presser-foot horizontally to feed the work uniform distances at regular intervals.

8. In a stitch-separating and indenting machine, the combination of a yielding lower work-support: a presser-foot constructed and arranged to bear upon the welt to clamp the work between it and said work-support without pressing upon the stitches: means for imparting to said presser-foot a positive or unyielding downward movement to clamp the work: means for moving said presser-foot horizontally, to feed the work uniform distances at regular intervals; a separating and indenting tool, non-adjustable to varying lengths of stitches: and means for imparting a positive or unyielding downward movement to said tool, to separate the stitches and indent the work.

9. In a stitch-separating machine the combination of a separating-tool, mechanism for actuating said tool, and work-feeding mechanism, combined and arranged to move the work in either direction to adjust the intervals between the stitches to the point of the separating-tool, substantially as described.

10. In a stitch-separating machine the combination with a work-support of a separating-tool arranged to move the work in either direction to adjust the interval between the stitches to the point of said tool, and mechanism for actuating said tool, substantially as described.

11. In a stitch-separating machine, the combination with a work-feed, and a separating-tool, of connected mechanisms operating automatically to actuate the work-feed to feed the work regular distances, to impart to the tool work-indenting movements and to release the work from the feed, to allow it to be moved along the line of the feed, to correct the operation of the feed for stitches of varying length, substantially as described.

12. In a stitch-separating and indenting machine, the combination with a feed mechanism for feeding the work regular distances, and a tool arranged to impart to the work a secondary feed to correct the distances to which the work is fed by the primary feed, for stitches of varying length, substantially as described.

In testimony whereof I have hereunto set my hand, in the presence of two attesting witnesses, this 31st day of July, 1896.

JOHN B. HADAWAY.

Witnesses:
T. HART ANDERSON,
A. G. CLIFFORD.